United States Patent
Roehrer et al.

(10) Patent No.: US 10,234,332 B2
(45) Date of Patent: Mar. 19, 2019

(54) BOLOMETER AND METHOD FOR MEASUREMENT OF ELECTROMAGNETIC RADIATION

(71) Applicant: ams AG, Unterpremstaetten (AT)

(72) Inventors: Georg Roehrer, Lebring-Sankt Margarethen (AT); Sara Carniello, Graz (AT)

(73) Assignee: ams AG, Unterpremstaetten (AT)

( * ) Notice: Subject to any disclaimer, the term of this patent is extended or adjusted under 35 U.S.C. 154(b) by 95 days.

(21) Appl. No.: 15/341,963

(22) Filed: Nov. 2, 2016

(65) Prior Publication Data

US 2017/0074725 A1    Mar. 16, 2017

Related U.S. Application Data

(63) Continuation-in-part of application No. PCT/EP2015/059058, filed on Apr. 27, 2015.

(30) Foreign Application Priority Data

May 7, 2014  (EP) ..................... 14167385

(51) Int. Cl.
  *G01J 5/02*  (2006.01)
  *G01J 5/20*  (2006.01)
(52) U.S. Cl.
  CPC .. *G01J 5/02* (2013.01); *G01J 5/20* (2013.01)
(58) Field of Classification Search
  None
  See application file for complete search history.

(56) References Cited

U.S. PATENT DOCUMENTS

| | | | |
|---|---|---|---|
| 2004/0200962 A1* | 10/2004 | Ishikawa | G01J 5/02 250/339.04 |
| 2005/0224714 A1 | 10/2005 | Akin et al. | |
| 2009/0314941 A1 | 12/2009 | Inomata | |
| 2011/0140224 A1 | 6/2011 | Kropelnicki et al. | |

FOREIGN PATENT DOCUMENTS

| | | |
|---|---|---|
| EP | 2105963 A2 | 9/2009 |
| JP | 03212979 | 9/1991 |
| JP | 08297052 | 11/1996 |
| WO | 2006051308 A1 | 5/2006 |
| WO | 2010147006 A1 | 12/2010 |

OTHER PUBLICATIONS

Nklaus, Frank, et al., "MEMS-Based Uncooled infrared Bolometer Arrays—A Review", MEMS/MOEMS Technologies and Applications III, Proc. of SPIE, vol. 6836, 2007, pp. 68360D-1-68360D-15.

* cited by examiner

*Primary Examiner* — Edwin G Gunberg
(74) *Attorney, Agent, or Firm* — Fish & Richardson P.C.

(57) ABSTRACT

A bolometer (10) comprises a first and a second suspension beam (12, 13) and a semiconductor portion (11) that is suspended by the first and the second suspension beam (12, 13) and comprises a first region (17) of a first conductivity type and a second region (18) of a second conductivity type. The first region (17) comprises a first triangle (21) or at least two stripes (40, 41) or islands (60, 61) which each contribute to a non-short-circuited diode (20) with the second region (18).

17 Claims, 9 Drawing Sheets

BOLOMETER AND METHOD FOR MEASUREMENT OF ELECTROMAGNETIC RADIATION

CROSS-REFERENCES TO RELATED APPLICATIONS

This application is a continuation-in-part of International Patent Application No. PCT/EP2015/059058, filed Apr. 27, 2015, which claims the benefit of priority to European Patent Application No. 14167385.5, filed on May 7, 2014, all of which are hereby incorporated by reference in their entirety for all purposes.

BACKGROUND OF THE INVENTION

The present invention relates to a bolometer and to a method for measurement of electromagnetic radiation.

A bolometer is sensitive for infrared radiation. Typically, a bolometer is a sensor measuring a power of infrared electromagnetic radiation by heating of a sensitive material. For example, the sensing material changes its resistance with temperature. Resistors of various materials like vanadium oxide, amorphous silicon and metals are used as sensing material. Alternatively, the sensing material is implemented as a silicon diode. The noise of the sensing material such as a l/f noise has an important effect on a key performance parameter of a bolometer named noise equivalent temperature difference, abbreviated to NETD.

Document US 2005/0224714 A1 refers to an ultra low-cost uncooled infrared detector array in CMOS. A diode micro-bolometer comprises an n-well semiconductor in which a p+ active region is formed.

In document US 2011/0140224 A1, a diode bolometer is illustrated comprising a semiconductor membrane having a single crystalline portion. Two complementary doped regions of the single crystalline portion form a diode.

Document JP H08297052 A describes a bolometer-type infrared sensor. A resistor constitutes a light receiving part. The thin film light receiving part comprises an n-type semiconductor region and a p-type semiconductor region, wherein at one end, the n-type semiconductor region is short-circuited to the p-type semiconductor region by a thin metal film.

SUMMARY OF THE INVENTION

In an embodiment, a bolometer comprises a first and a second suspension beam as well as a semiconductor portion. The semiconductor portion is suspended by the first and the second suspension beam. The semiconductor portion comprises a first region of a first conductivity type and a second region of a second conductivity type. The first region comprises a first triangle or at least two stripes or islands which each contribute to a non-short-circuited diode with the second region.

Advantageously, the first region and the second region form a non-short-circuited diode. A diode width of the diode is enlarged by splitting the first region into the at least two stripes or islands or forming the first region as the first triangle. The diode may comprise several diode elements which are formed by junctions of the second region to the at least two stripes or islands. Advantageously, the large diode width results in a large diode area which in turn reduces the l/f noise and, thus, the noise equivalent temperature difference. The diode width can also be called junction width.

In an embodiment, the first region and the second region both reach from a first semiconductor surface of the semiconductor portion to a second semiconductor surface of the semiconductor portion.

In an embodiment, a perimeter of the semiconductor portion is circular, elliptical or may be a polygon having three to eight edges. The perimeter may be a circle, hexagon or rectangle such as a square. Optionally, the perimeter is rectangular such as quadratic. The perimeter can also called a circumference, an outline or an outside edge. The length of the perimeter may be the sum of the side lengths.

In an embodiment, the semiconductor portion has four sides with four side lengths. The diode width at the first semiconductor surface is larger than each of the four side lengths.

In an embodiment, the diode width at the first semiconductor surface is larger than a quarter of a length of a perimeter of the semiconductor portion.

In an embodiment, the diode width at the first semiconductor surface is larger than the length of the perimeter of the semiconductor portion.

In a further embodiment, the diode width at the first semiconductor surface is larger than the fivefold of the length of the perimeter of the semiconductor portion.

The diode width is equal to a length of a line or to a sum of the lengths of the lines at which the first region is in contact with the second region at the first semiconductor surface. An area of the diode can approximately be calculated by multiplying the diode width with the thickness of the semiconductor portion.

The first conductivity type is opposite to the second conductivity type.

In an embodiment, the border of the semiconductor portion is formed by the first and the second semiconductor surface and the four sides. The four sides can also be named four side surfaces. The semiconductor portion has a form of a cuboid, especially as a rectangular cuboid. The first and the second suspension beams are attached to the cuboid.

Alternatively, the semiconductor portion is formed as a circular disc.

In an embodiment, the semiconductor portion is made of single crystal silicon. The semiconductor portion may comprise a thin single crystal silicon layer such as an epitaxial layer or a silicon-on-insulator layer. The first region is realized as doped region or doped regions at the first semiconductor surface. Said region or regions may extend to the second semiconductor surface or may not reach the second semiconductor surface. The diode may be realized by a well structure, wherein the well forms the second region and a diffused region or diffused regions inside of the well form the first region.

In an embodiment, the semiconductor portion is made of poly-silicon. The semiconductor portion may be fabricated from a poly-silicon layer. Optionally, the diode is not realized by a well structure.

In an embodiment, the first semiconductor surface is directed towards an electromagnetic radiation that is to be detected. The absorption of the electromagnetic radiation results in an increase of a temperature of the semiconductor portion that is detected by the diode. The electromagnetic radiation may be an infrared radiation.

The first semiconductor surface may be covered by an isolating layer. The isolating layer may be, for example, made of silicon dioxide or silicon nitride. A thickness of the isolating layer may be between 0.5 μm and 4 μm. The isolating layer may be realized such that electromagnetic radiation is absorbed by the isolating layer. The bolometer may alternatively be covered by another layer that absorbs electromagnetic radiation.

In an embodiment, the second semiconductor surface is not directed towards the radiation that is to be detected. The second semiconductor surface may be covered by a further isolating layer. Thus, the semiconductor portion can be encapsulated on the top side and on the bottom side by the isolating layer and the further isolating layer.

The first and the second suspension beam each connect the semiconductor portion to a frame of the bolometer. The frame may comprise a semiconductor such as a single crystal semiconductor.

In an embodiment, a length of the first suspension beam and a length of the second suspension beam is longer than a width of a gap between the semiconductor portion and the frame. For example, the lengths are larger than the threefold of the width of the gap. Advantageously, the first and the second suspension beam provides a thermal isolation of the semiconductor portion to the frame. The thermal isolation is increased by the long length of the first and the second suspension beam.

In an embodiment, the first and the second suspension beam comprise a silicide or a thin metal layer.

In an embodiment, the first and the second suspension beam comprises a semiconductor layer that may be made of poly-silicon.

In an embodiment, the first and the second suspension beam are free of a metal layer. A metal layer typically results in a high thermal conductivity. Since the first and the second suspension beam are fabricated without a metal layer, the thermal conductivity of the first and the second suspension beam is kept low.

The semiconductor layer of the first suspension beam may have the first conductivity type and the semiconductor layer of the second suspension beam may have the second conductivity type.

Optionally, the first suspension beam provides an electrical contact to the first region of the semiconductor portion and the second suspension beam provides an electrical contact to the second region of the semiconductor portion.

In an embodiment, the at least two stripes of the first region are electrically connected to each other. The second region comprises at least one stripe that separates the at least two stripes of the first region. Thus, the stripe of the second region is arranged between the two stripes of the first region. The at least two stripes of the first region are electrically connected to the first suspension beam. The at least one stripe of the second region is electrically connected to the second suspension beam. In an example, a first number of stripes of the first region and a second number of stripes of the second region are high to achieve a large diode width.

The at least two stripes of the first region and the at least one stripe of the second region may be rectangular. Alternatively, the at least two stripes of the first region and the at least one stripe of the second region may be tapered. The tapered stripe or stripes may have the form of a triangle, trapezoid—such as an isosceles trapezoid—or parallelogram.

In a further embodiment, the first region comprises a further stripe that electrically connects the at least two stripes of the first region to each other. The further stripe may electrically connect the first suspension beam to the at least two stripes of the first region. The further stripe and the at least two stripes of the first region obtain the first conductivity type. The at least two stripes of the first region run parallel to each other. The at least two stripes of the first region have the same main direction. Said main direction is perpendicular to a main direction of the further stripe.

In an embodiment, the at least two stripes of the first region and the further stripe of the first region are completely surrounded in the plane of the semiconductor portion by the second region, the isolating layer and the semiconductor layer of the first and the second suspension beam. Thus, the sides or side surfaces of the at least two stripes of the first region and the further stripe of the first region are covered partially by the second region and partially by the isolating layer and partially by the semiconductor layer of the first and the second suspension beam.

In a further embodiment, the second region comprises an additional stripe electrically connecting the at least one stripe of the second region to the second suspension beam. If the second region comprises at least two stripes, the additional stripe may electrically connect the at least two stripes to each other. The additional stripe and the at least one stripe of the second region obtain the second conductivity type.

In an embodiment, the at least two stripes of the first region are electrically connected to each other by a metal connection. The metal connection may be implemented as a metal connecting line. The first suspension beam may be electrically connected to the at least two stripes of the first region by the metal connection.

In an embodiment, the at least two stripes of the first region are completely surrounded in the plane of the semiconductor portion by the second region and the isolating layer. Thus, the sides or side surfaces of the at least two stripes of the first region are covered partially by the second region and partially by the isolating layer.

In an embodiment, the at least one stripe of the second region is electrically connected to the second suspension beam by an additional metal connection. The additional metal connection may be implemented as an additional metal connecting line. In case the second region comprises at least two stripes, the stripes of the second region may be connected to each other by the additional metal connection.

The metal connection as well as the additional metal connection advantageously reduce a series resistance of the diode.

In an embodiment, the at least two islands of the first region are electrically connected to each other. The at least two islands of the first region may be completely surrounded in the plane of the semiconductor portion by the second region. The side, sides or side surfaces of each of the at least two islands of the first region of the semiconductor portion are fully covered by the second region. The at least two islands may be circular, elliptical, triangular, trapezoidal, rhomboid or rectangular such as quadratic. The at least two islands of the first region are electrically connected to the first suspension beam. A metal connection may electrically connect the at least two islands of the first region to each other and to the first suspension beam. Thus, the first region is split into at least two separate islands.

In an embodiment, the at least two islands of the first region are arranged in an array form.

In an embodiment, the at least two islands of the first region are arranged in a checkered manner or chessboard pattern.

In an embodiment, the second region comprises at least two additional islands. Thus, the at least two islands of the first region and the at least two additional islands of the second region are arranged in a checkered manner or chessboard pattern.

By the stripes and by the islands, the diode width is increased for a predetermined value of an area of the bolometer. Thus, the value of the diode width is maximized for the predetermined value of the area of the bolometer.

In an embodiment, a semiconductor body comprises an array of bolometers as described above. The array of bolometers can be realized as a focal plane array. The array of bolometers may be part of an infrared imaging system.

In an embodiment, a bolometer comprises a first and a second suspension beam as well as a semiconductor portion. The semiconductor portion is suspended by the first and the second suspension beam. Moreover, the semiconductor portion comprises a first region of a first conductivity type and a second region of a second conductivity type. The first and the second region both reach from a first semiconductor surface of the semiconductor portion to a second semiconductor surface of the semiconductor portion. The first region and the second region form a non-short-circuited diode. The diode may comprise a diode width at the first semiconductor surface that may be larger than a quarter of a length of a perimeter of the semiconductor portion.

In an embodiment, a method for the measurement of electromagnetic radiation comprises setting a diode of a bolometer in an operating point and absorbing the electromagnetic radiation by the bolometer. Furthermore, an electrical parameter of the diode is measured in the operating point. The bolometer comprises a first and a second suspension beam and a semiconductor portion suspended by the first and the second suspension beam. The semiconductor portion comprises a first region of a first conductivity type and a second region of a second conductivity type. The first region comprises a first triangle or at least two stripes or islands which each contribute to the non-short-circuited diode with the second region.

Advantageously, the first triangle or the at least two islands or stripes result in a large value of a diode width of the diode and allow a low noise equivalent temperature difference. The bolometer may be realized as an uncooled bolometer.

In an embodiment, the at least two stripes of the first region or the at least two islands of the first region are electrically connected to each other and to the first suspension beam either by a metal connection or by the metal connection and further metal connections.

BRIEF DESCRIPTION OF THE DRAWINGS

The present patent application will be described in detail below for several exemplary embodiments with reference to the figures. Components, parts and layers that are functionally identical or have the identical effect bear identical reference numbers. Insofar as components, parts or layers correspond to one another in function, a description of them will not be repeated in each of the following figures, wherein.

DETAILED DESCRIPTION

Figure 1A:
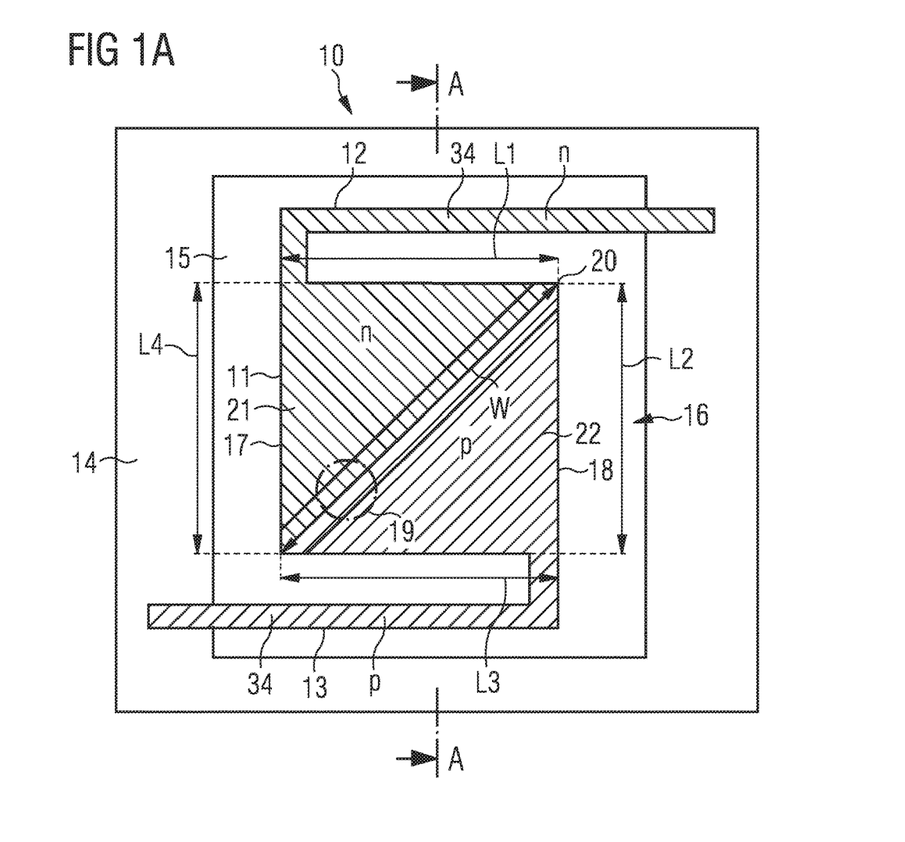
FIGS. 1A and 1B show an exemplary embodiment of a bolometer.

FIG. 1A shows an exemplary embodiment of a bolometer 10 in a top view. The bolometer 10 comprises a semiconductor portion 11 and a first and a second suspension beam 12, 13. Moreover, the bolometer 10 comprises a frame 14 that is separated from the semiconductor portion 11 by a gap 15. The frame 14 may comprise a bulk silicon, a field oxide and/or a metal layer. The semiconductor portion 11 is suspended by the first and the second suspension beam 12, 13. A length of the first suspension beam 12 is larger than a width of the gap 15, optionally larger than a minimum width of the gap 15. Additionally, a length of the second suspension beam 13 is larger than a width of the gap 15, optionally larger than the minimum width of the gap 15. Alternatively, the length of the first suspension beam 12 and the length of the second suspension beam 13 are larger than a maximum width of the gap 15. The first and the second suspension beam 12, 13 can also be named as a leg. The semiconductor portion 11 is in a cavity 16 of the bolometer 10. The semiconductor portion 11 has a rectangular form, for example a quadratic form, in the top view.

The semiconductor portion 11 comprises a first region 17 of a first conductivity type and a second region 18 of a second conductivity type. The first conductivity type is n-doped and the second conductivity type is p-doped. The first and the second suspension beams 12, 13 comprise a semiconductor layer 34. The semiconductor layer 34 of the first suspension beam 12 is of the first conductivity type and the semiconductor layer 34 of the second suspension beam 13 is of the second conductivity type. Thus, the first suspension beam 12 has the same conductivity type as the first portion 17. Moreover, the second suspension beam 13 has the same conductivity type as the second portion 18. The first and the second portion 17, 18 have the form of a first and a second triangle 21, 22. The first triangle 21 of the first region 17 and the second triangle 22 of the second region 18 are designed as right-angled triangles. The semiconductor portion 11 consists of the first and the second triangle 21, 22. The first and the second triangle 21, 22 of the first and the second portion 17, 18 form the rectangle of the semiconductor portion 11.

The first and the second portion 17, 18 form a diode 20 having a space charge region 19 between them. A diode width W is a line at which the first portion 17 contacts the second portion 18. In FIG. 1A, the diode width W is a diagonal of the semiconductor portion 11. Thus, the diode width W is larger than a quarter of a length of a perimeter of the semiconductor portion 11. The perimeter is formed by the four sides of the semiconductor portion 11 neglecting the first and the second suspension beam 12, 13. The diode width W is larger than each of the four side lengths L1 to L4 of the four sides of the semiconductor portion 11. The length of the perimeter is the sum of the side lengths L1+L2+L3+L4. The first suspension beam 12 electrically and mechanically contacts the first region 17 at the right angle of the first triangle 21. Correspondingly, the second suspension beam 13 electrically and mechanically contacts the second region 18 at the right angle of the second triangle 22.

In an alternative embodiment, not shown, the bolometer 10 comprises at least a further suspension beam suspending the semiconductor portion 11 to the frame 14.

In an alternative embodiment, the first conductivity type is p-doped and the second conductivity type is n-doped.

Figure 1B:
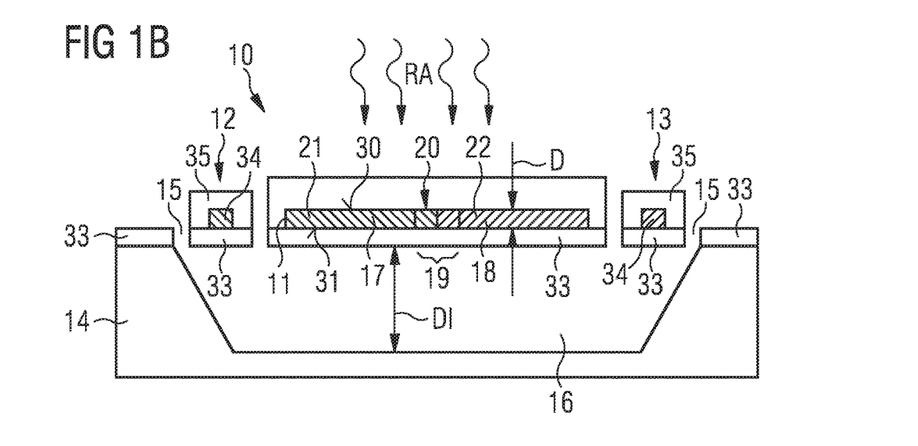

FIG. 1B shows an exemplary embodiment of a cross-section of the bolometer 10 illustrated in FIG. 1A. The cross-section is located as shown in FIG. 1A by the arrows A. The semiconductor portion 11 has a first and a second semiconductor surface 30, 31. The first semiconductor surface 30 is directed towards an electromagnetic radiation RA that is to be detected. The electromagnetic radiation RA may be an infrared radiation. The second semiconductor surface 31 is not directed towards the electromagnetic radiation RA. The second semiconductor surface 31 is directed towards the cavity 16. The first semiconductor surface 30 is covered by an isolating layer 32. The isolating layer 32 may be designed for absorption of the electromagnetic radiation RA. The isolating layer 32 may be made of silicon dioxide or silicon nitride. The isolating layer 32 may have a thickness between 0.5 and 4 μm. For example, the isolating layer 32 has a thickness of 2.5 μm. The isolating layer 32 may be realized as a multilayer structure. The isolating layer 32 also covers the sides of the semiconductor portion 11 with the exception of the connections of the semiconductor portion 11 to the semiconductor layer 34 of the first and the second suspension beam 12, 13.

The second semiconductor surface 31 is covered by a further isolating layer 33. The further isolating layer 33 may have a thickness between 0.1 and 0.5 μm, for example 0.3 μm. Thus, the isolating layer 32, the semiconductor portion 11 and the further isolating layer 33 form a stack. The semiconductor portion 11 is made of poly-silicon. The poly-silicon may have a thickness between 0.1 and 1.0 μm, for example 0.2 μm.

The first and the second suspension beam 12, 13 comprise the semiconductor layer 34. The semiconductor layer 34 of the first and the second suspension beam 12, 13 is made of poly-silicon. An additional isolating layer 35 and the further isolating layer 33 cover the semiconductor layer 34 of the first and the second suspension beam 12, 13. The additional layer 35 may be thinner than the isolating layer 32. FIG. 1A does not show the isolating layers 32, 33 and 35 shown in FIG. 1B.

For the production of the bolometer 10, a surface of the frame 14 is first covered by the further isolating layer 33. For example, the further isolating layer 33 is fabricated by thermal oxidation of the semiconductor material of the frame 14. On top of the further isolating layer 33, a poly-silicon layer is formed, for example by chemical vapor deposition of poly-silicon. The poly-silicon layer is patterned to achieve the semiconductor portion 11 and the semiconductor layer 34 of the first and the second suspension beam 12, 13. Two ion implantation steps are used to realize the doping of the first conductivity type of the first region 17 and to realize the doping of the second conductivity type of the second region 18. After the two ion implantation steps, the isolating layer 32 is deposited on top of the semiconductor portion 11. Optionally, the isolating layer 32 is deposited in two steps, namely by a deposition of a first and a second interlevel dielectric. The isolating layer 32 and the further isolating layer 33 are patterned to achieve the gap 15 between the semiconductor portion 11 and the frame 15 and to release the first and the second suspension beam 12, 13. The cavity 16 is formed by an etching process using the openings in the isolating layer 32 and the further isolating layer 33. By the etching process, the semiconductor material directly below the further isolating layer 33 is removed. Thus, the above-mentioned stack is only suspended by the first and the second suspension beam 12, 13.

The first and the second region 17, 18 form the diode 20. An area A of the diode 20 depends on a thickness D of the semiconductor portion 11 and the diode width W according to the equation A=D*W. The diode 20 is contacted via the first and the second suspension beam 12, 13. On the other side, the first and the second suspension beam 12, 13 may be connected to not shown contact pads on the frame 14.

A constant voltage V is applied via the first and the second suspension beam 12, 13 to the diode 20. The voltage V is chosen such that the diode 20 is biased in the forward direction. A current I flows through the diode 20 via the first and the second suspension beam 12, 13 and can be measured. In case of an electromagnetic radiation RA, the radiation RA is absorbed by the stack of the isolating layer 32, the semiconductor portion 11 and the further isolating layer 33. The absorption results in a rise of the temperature of the semiconductor portion 11 leading to a change of the current I of the diode 20. By choosing the value of the constant voltage V, the diode 20 is set in an operating point. The current I is an electrical parameter of the diode 20 that can be measured in said operating point. The current I increases with increasing electromagnetic radiation RA.

Alternatively, a constant current I is provided to the diode 20 and the voltage V which can be tapped at the diode 20 via the first and the second suspension beam 12, 13 is measured. By choosing the value of the constant current I, the diode 20 is set in an operating point. The diode 20 is forward biased. The voltage V that can be tapped across the diode 20 is an electrical parameter of the diode 20 that can be measured in said operating point. The voltage V decreases with increasing electromagnetic radiation RA.

Thus, the diode 20 is implemented as poly diode. The diode 20 is made by deposition of a low or un-doped poly-silicon. The n- and p-type doping of the poly-silicon is done together with the source/drain implantations of a CMOS process. Hence, the thermal budget is small and a narrow diode stripe pitch becomes feasible resulting in a large diode width W and hence a reduced 1/f noise component.

In an embodiment, a distance DI from the further isolating layer 33 to the bottom of the cavity 16 may be in the range between 2 to 3 μm. Thus, the distance DI may be approximately a quarter of a wavelength of the electromagnetic radiation RA that is to be detected. This distance DI may result in an absorption of the radiation by the semiconductor portion 11 and the two isolating layers 32, 33 due to a mirror effect.

The first suspension beam 12 is free of a metal layer or a metal connection. Similarly, the second suspension beam 13 is also free of a metal layer or a metal connection. Thus, the first and the second suspension beam 12, 13 achieve a low thermal conductivity.

In an alternative embodiment, the semiconductor layer 34 of the first suspension beam 12 has the opposite conductivity type as the first region 17, namely the second conductivity type. Thus, a short metal connection is required to connect the first region 17 to the first suspension beam 12.

In an alternative embodiment, the semiconductor layer 34 of the second suspension beam 13 may have an opposite conductivity type to the second region 18, namely the first conductivity type. Thus, a short metal connection is required to connect the second region 18 to the second suspension beam 13.

Thus, the semiconductor layer 34 of the first and the second suspension beam 12, 13 may have equal or different conductivity types.

The paragraphs above not only describe the bolometer 10 shown in FIGS. 1A and 1B, but also some of the features of the embodiments of the bolometer 10 illustrated in the further Figures.

Figure 2A:
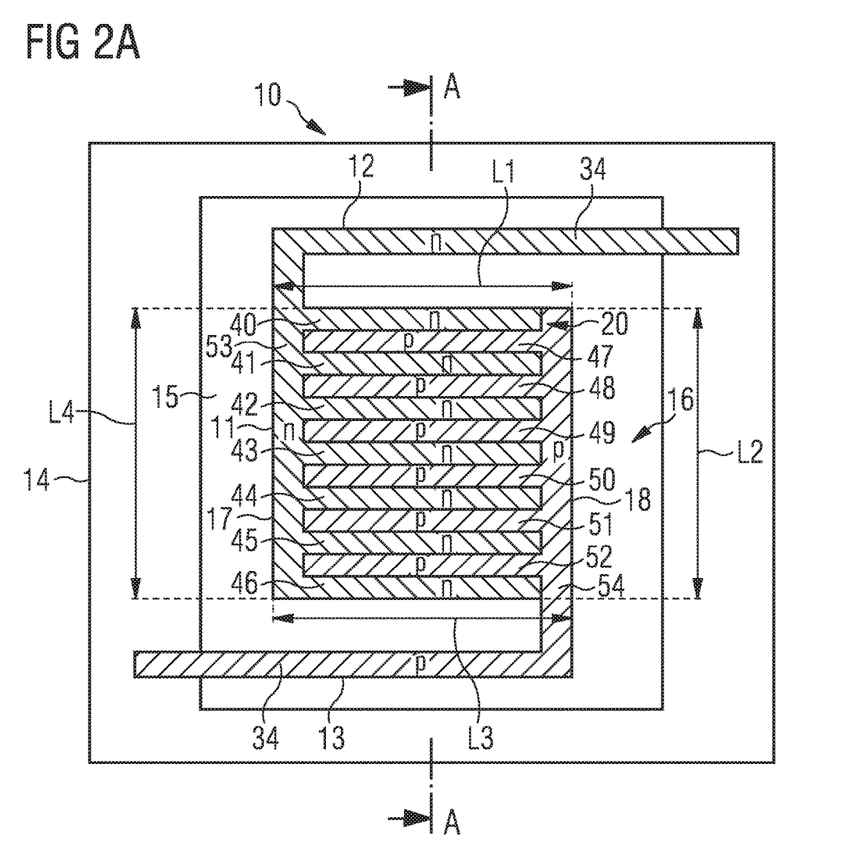
FIGS. 2A to 2C show further exemplary embodiments of the bolometer.

FIG. 2A shows a top view of an alternative embodiment of the bolometer 10 which is a further development of the bolometer 10 shown in FIGS. 1A and 1B. The first region 17 of the semiconductor portion 11 comprises at least two stripes 40, 41. The second region 18 comprises at least one stripe 47. The at least one stripe 47 of the second region 18 is located between the at least two stripes 40, 41 of the first region 17. The at least two stripes 40, 41 of the first region 17 are separated from each other by the at least one stripe 47 of the second region 18.

Thus, the first region 17 has a first number N of stripes 40 to 46. The second region 18 comprises a second number M of stripes 47 to 52. In the exemplary embodiment shown in FIG. 2A, the first number N of stripes 40 to 46 is 7 and the second number M of stripes 47 to 52 is 6. The first number N of stripes 40 to 46 of the first region 17 are separated from each other by the second number M of stripes 47 to 52 of the second region 18. A difference of the first number N and of the second number M is 0 or 1.

The at least two stripes 40, 41 of the first region 17 have a rectangular form. The at least one stripe 47 of the second region 18 also has a rectangular form.

Additionally, the first region 17 comprises a further stripe 53. The further stripe 53 connects the at least two stripes 40, 41 of the first region 17 to each other. A main direction of the further stripe 53 is perpendicular to a main direction of the at least two stripes 40, 41 of the first region 17. The further stripe 53 connects the at least two stripes 40, 41 of the first region 17 to the first suspension beam 12.

Correspondingly, the second region 18 comprises an additional stripe 54 that electrically connects the at least one stripe 54 of the second region 18, namely the second number M of stripes 47 to 52, to each other in case the second number M is more than one. The additional stripe 54 also connects the at least one stripe 47 of the second region 18 to the second suspension beam 13. The additional stripe 54 has a main direction that is perpendicular to the main direction of the at least one stripe 47 of the second region 18. Thus, the first and the second region 17, 18 form an interdigitated structure.

The diode width W has the form of a meander or of a zigzag structure. Advantageously, the value of the diode width W is increased in comparison to the diode width W of the bolometer 10 shown in FIG. 1A. A first side of the semiconductor portion 11 that runs parallel to the main direction of the stripes 40-46 has a first side lengths L1. The diode width W depends on the first number N, the second number M and on the first side lengths L1. The diode width W can be approximately calculated according to $W=(N+M-1)*L1$. The diode width W at the first semiconductor surface 30 may be larger than the length of the perimeter of the semiconductor portion 11 that is the sum of the four side lengths L1 to L4. Thus, the equation may be valid: $W>L1+L2+L3+L4$. The diode width W at the first semiconductor surface 30 may be even larger than the fivefold of the length of the perimeter of the semiconductor portion 11.

A distance between two stripes 40, 41 of the first region 17 is typically between 0.5 µm and 1.5 µm, for example 1 µm. Thus, a width of the stripes 40 to 46 of the first region 17 is typically between 0.5 µm and 1.5 µm, for example 1 µm. The width of the stripes 40 to 46 of the first region 17 may be equal as the minimum width achievable for the given semiconductor technology. A width of the stripes 47 to 52 of the second region 18 is equal to the width of the stripes 40 to 46 of the first region 17. An area of the semiconductor portion 11 may be for example 20 µm*20 µm.

Figure 2B:
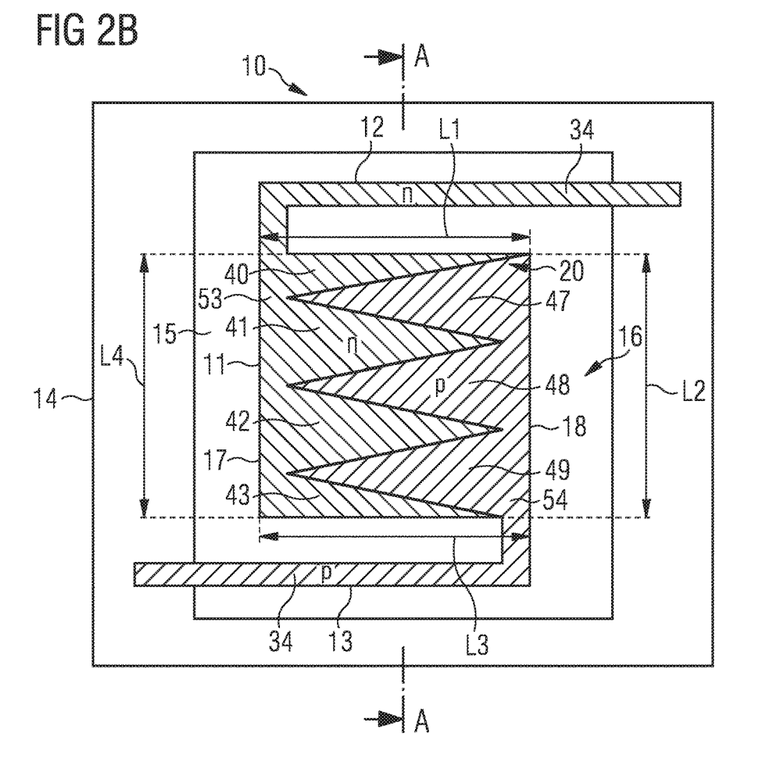

FIG. 2B shows a further exemplary embodiment of the bolometer 10 which is a further development of the bolometer shown in the figures above. In FIG. 2B, the at least two stripes 40, 41 of the first region 17 are tapered. Also, the at least one stripe 47 of the second region 18 is tapered. By tapering the stripes, a more homogenous current distribution over the diode width W can be achieved. The tapered stripes 40, 41, 47 of the first and the second region 17, 18 have the form of triangles. Optionally, the tips of the triangles are rounded.

Figure 2C:
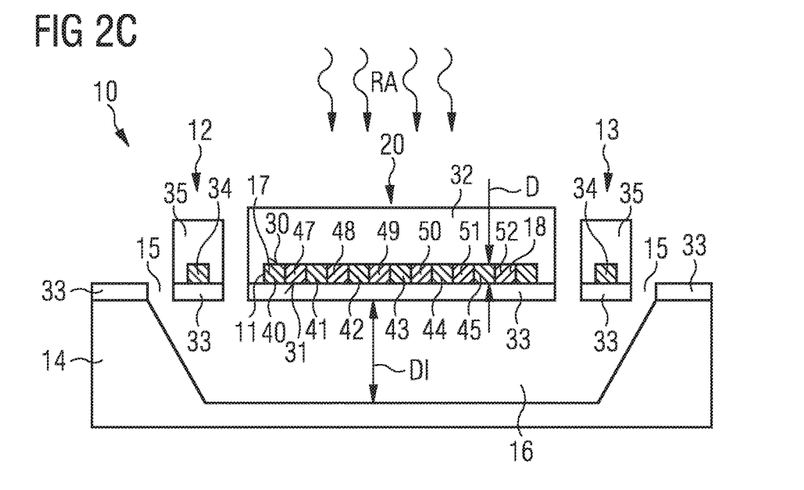

FIG. 2C shows an embodiment of a cross-section of the bolometer 10 shown in FIG. 2A. The cross-section is located as shown in FIG. 2A by the arrows A. In the cross-section, the first number N of stripes of the first region 17 and the second number M of stripes of the second region 18 is shown. The first and the second region 17, 18 extend from the first semiconductor surface 30 to the second semiconductor surface 31. The isolating layer 32 not only covers the first semiconductor surface 30 but also the sides of the semiconductor portion 11. Thus, the semiconductor portion 11 is encapsulated at all sides and surfaces by the isolating layer 32 and the further isolating layer 33 with the exception of the connections of the semiconductor portion 11 to the semiconductor layer 34 of the first and the second suspension beam 12, 13. This increases the stability of the bolometer 10.

For the fabrication of the cross-section shown in FIG. 2C, the semiconductor portion 11 and the semiconductor layer 34 are deposited on the further isolating layer 33. A chemical vapor deposition step is used for the deposition of the semiconductor portion 11 and the semiconductor layer 34 realized as poly-silicon. After deposition, the semiconductor portion 11 and the semiconductor layer 34 are patterned such that the semiconductor portion 11 and the semiconductor layer 34 achieve the form of the first and the second suspension beam 12, 13 and the semiconductor portion 11, for example shown in the top view of FIGS. 1A, 2A, 2B, 3A and 4. Two ion implantation steps are performed to realize the first and the second region 17, 18 of the semiconductor portion 11 and to realize the doping of the first and the second suspension beam 12, 13. After the patterning of the semiconductor portion 11 and the semiconductor layer 34 and after the two ion implantation steps, the isolating layer 32 is deposited. The deposition of the isolating layer 32 is performed via chemical vapor deposition. The isolating layer 32 is also deposited on the sides of the semiconductor portion 11.

Then, openings are etched in the isolating layer 32 and in the further isolating layer 33. The silicon material under the further isolating layer 33 is etched away to form the cavity 16 by an etching process that uses said openings. The measurement of the electrical parameter of the diode 20 in an operating point is performed such as described above.

The bolometer 10 as elucidated in FIG. 2B has a similar cross section to the embodiments shown in FIGS. 1B and 2C.

The diode width W can also called junction width. The diode width W is increased by stripe pattern of n-type and p-type doping. The stripes 40 to 46, 47 to 52 can be parallel as shown in FIG. 2A or tapered as shown in FIG. 2B.

Figure 3A:
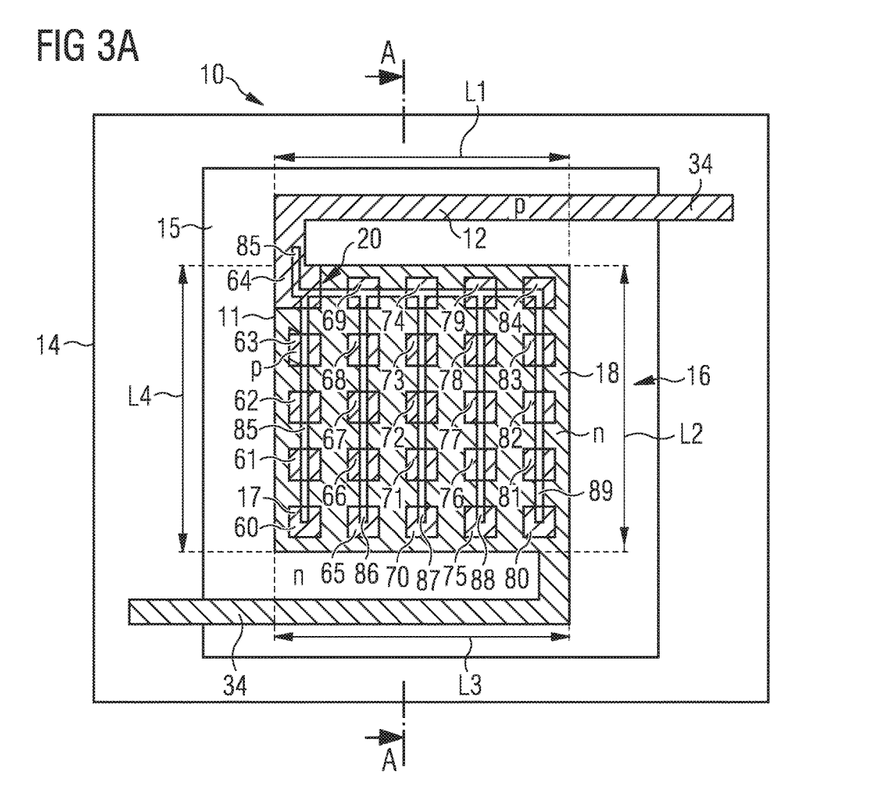
FIGS. 3A and 3B show an additional exemplary embodiment of the bolometer.
Figure 4:
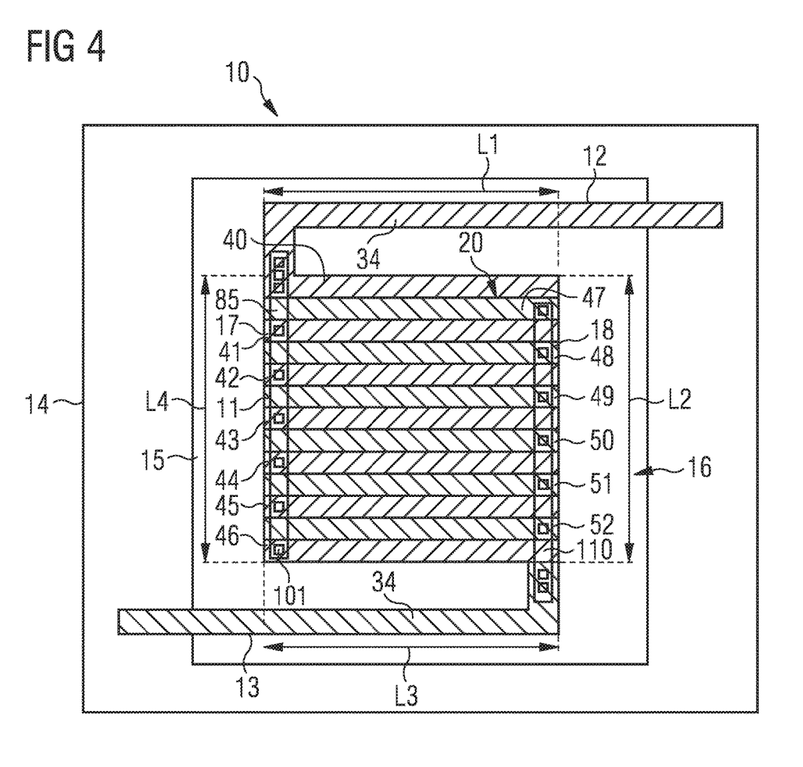
FIG. 4 shows another exemplary embodiment of the bolometer.

Optionally, the first region 17 can be connected by metal to the first suspension beam 12. The second region 18 can be connected to the second suspension beam 13 by metal also. The diode width W is enlarged by multiple stripes. This is particularly useful if the poly-silicon area has holes and thus n-type or p-type stripes without connection to the bolometer leg of the same doping type can be present, as shown in FIGS. 3A and 4. Advantageously, this metal connection stops at the corner of the sensor in vicinity to the suspension beams 12, 13 of the bolometer 10 because a metal covering the suspension beams 12, 13 would result in a high thermal conductivity causing a poor bolometer performance. n- and p-type doping can be exchanged.

FIG. 3A shows a further exemplary embodiment of the bolometer 10 which is a further development of the above-shown bolometers. The first region 17 of the semiconductor portion 11 comprises at least two islands 60, 61. The at least two islands 60, 61 obtain the first conductivity type. The at least two islands 60, 61 are isolated from each other by a pn junction. Thus, each of the at least two islands 60, 61 of the first region 17 is surrounded by the second region 18. The at least two islands 60, 61 are connected to the first suspension beam 12. The connection of the at least two islands 60, 61 is provided by a metal connection 85.

The first region 17 may comprise a number NI of islands 60 to 84. The number NI of islands 60 to 84 are arranged in a regular way, for example in an array form or matrix form. The number NI of islands 60 to 84 are located in columns and rows. The number NI of islands 60 to 84 are connected to the first suspension beam 12 via the metal connection 85 and further metal connections 86 to 89. The metal connection 85 and the further metal connections 86 to 89 may be arranged in a comb form such as shown in FIG. 3A. However, other configurations of the metal connections 85, 86 to 89 are possible. The metal connection 85 and the further metal connections 86 to 89 are arranged such that each of the number NI of the islands 60 to 84 is connected to the first suspension beam 12. One of the islands 64 that is adjacent to the first suspension beam 12 is directly connected to the first suspension beam 12. Thus, a part of the second region 18 is not arranged between the adjacent island 64 and the first suspension beam 12. Each of the islands 60 to 84 and the surrounding second region 18 form a diode element. The diode 20 comprises the number NI of diode elements. The diode width W is the sum of the width of the several diode elements. The diode 20 is formed by the parallel circuit of the diode elements. The diode 20 is realized by the parallel circuit of the islands 60 to 84 of the first region 17 to the second region 18. The junctions between the second region 18 and the at least two islands 60 to 84 of the first region 17 are electrically connected parallel and form the diode 20 of the bolometer 10.

Figure 3B:
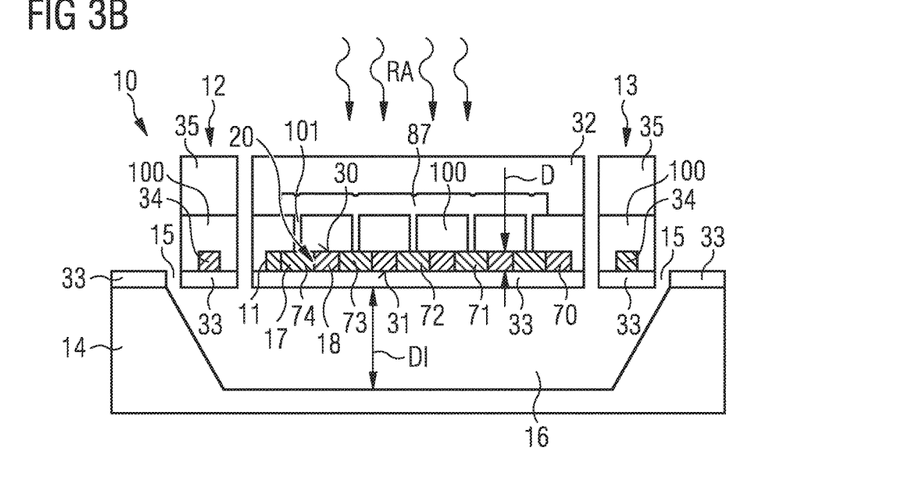

FIG. 3B shows a cross-section of the bolometer 10 shown in FIG. 3A. The cross-section shown in FIG. 3B is a further development of the cross-sections shown in FIGS. 1B and 2C. The further metal connection 87 is directly in contact with at least two islands 70 to 74 of the first region 17. The further metal connection 87 is electrically connected to the at least two islands 70 to 74 of the first region 17 by a via 101. For the sake of clarity, the vias 101 are not shown in FIG. 3A. An additional isolating layer 100 is arranged between the second region 18 and the further metal connection 87. The additional isolating layer 100 may be implemented as interlevel dielectric and may have a thickness of 1 µm. Contact holes in the additional isolating layer 100 allow an ohmic contact of the further metal connection 87 to the islands 70 to 74. The isolating layer 32 is located on top of the further metal connection 87. The metal connection 85 has features corresponding to the features of the further metal connection 87. The metal connection 85 may have a thickness in the range of 0.2 µm to 1 µm, for example 0.5 µm.

Thus, the bolometer 10 comprises a stack of the further isolating layer 33, the first region 17, the metal connection 85 and the isolating layer 32 and also a stack formed by the further isolating layer 33, the second region 18, the additional isolating layer 100, the metal connection 85 and the isolating layer 32. The additional isolating layer 100 may be made of silicon dioxide. The additional isolating layer 100 may be fabricated by thermal oxidation of the underlying semiconductor portion 11 or by chemical vapor deposition.

In FIGS. 3A and 3B, the first conductivity type is p-doped and the second conductivity type is n-doped. The diode width W is increased by p-type islands 60 to 84 in the n-type area 18 or vice versa. In this case the p-type islands 60 to 84 have to be connected by metal to the p-type suspension beam 12. The diode junction of the diode 20 is formed between the p-doped islands 60 to 84 to the n-doped second region 18. The resulting diode length W is much larger compared to the embodiment shown in FIG. 1A. The p-type islands 60 to 84 are connected with contacts and metal to the p-doped side. Of course, n- and p-type doping can be exchanged.

FIG. 4 shows a further exemplary embodiment of the bolometer 10 that is a further development of the above-shown embodiments. The semiconductor portion 11 comprises at least two stripes 40, 41 of the first region 17 and at least one stripe 47 of the second region 18. The stripes 40 to 46 of the first region 17 are separated from each other by the stripes 47 to 52 of the second region 18. The stripes 40 to 46 of the first region 17 and the stripes 47 to 52 of the second region 18 are arranged in a ladder form. The stripes 40 to 46 of the first region 17 are not electrically connected to each other by a semiconductor region or portion. Similarly, the stripes 47 to 52 of the second region 18 are also not electrically connected to each other by a semiconductor region or portion. The first suspension beam 12 is connected to the at least two stripes of the first region 17 by the metal connection 85. The metal connection 85 is electrically connected to the at least two stripes 40 to 46 of the first region 17 and optionally also to the first suspension beam 12 by at least two vias 101. Correspondingly, the stripes 47 to 52 of the second region 18 are connected to the second suspension beam 13 by an additional metal connection 110. The additional metal connection 110 is electrically connected to the at least two stripes 47 to 52 of the second region 18 and optionally also to the second suspension beam 13 by at least two vias 101. The metal connection 85 and the additional metal connection 110 keep a series resistance of the diode 20 low and, thus, improve the electrical performance of the diode 20.

The diode 20 comprises several diode elements. The diode width W is the sum of the width of the several diode elements. Thus, the diode width W is increased in comparison to the bolometer 10 shown in FIG. 1A. The diode width W can be calculated according to $W=(N+M-1)*L1$. The diode 20 is formed by the parallel circuit of the diode elements. The diode 20 is realized by the parallel circuit of the at least two stripes 40, 41 of the first region 17 to the at least one stripe 47 of the second region 18. The junctions between the at least two stripes 40, 41 of the first region 17 and the at least one stripe 47 of the second region 18 are electrically connected parallel and form the diode 20 of the bolometer 10.

Since most of the first and the second suspension beam 12, 13 is free of a metal connection or a metal layer, the semiconductor portion 11 of the bolometer 10 has a high thermal insulation towards the frame 14. This advantageously reduces the noise equivalent temperature difference.

In an alternative embodiment, the semiconductor portion 11 of FIGS. 1A, 2A, 2B, 3A and 4 are combined. For example, the islands of the first region 17 are realized as circles, stripes, rhombus, triangles, trapezoids or parallelograms.

Figure 5A:
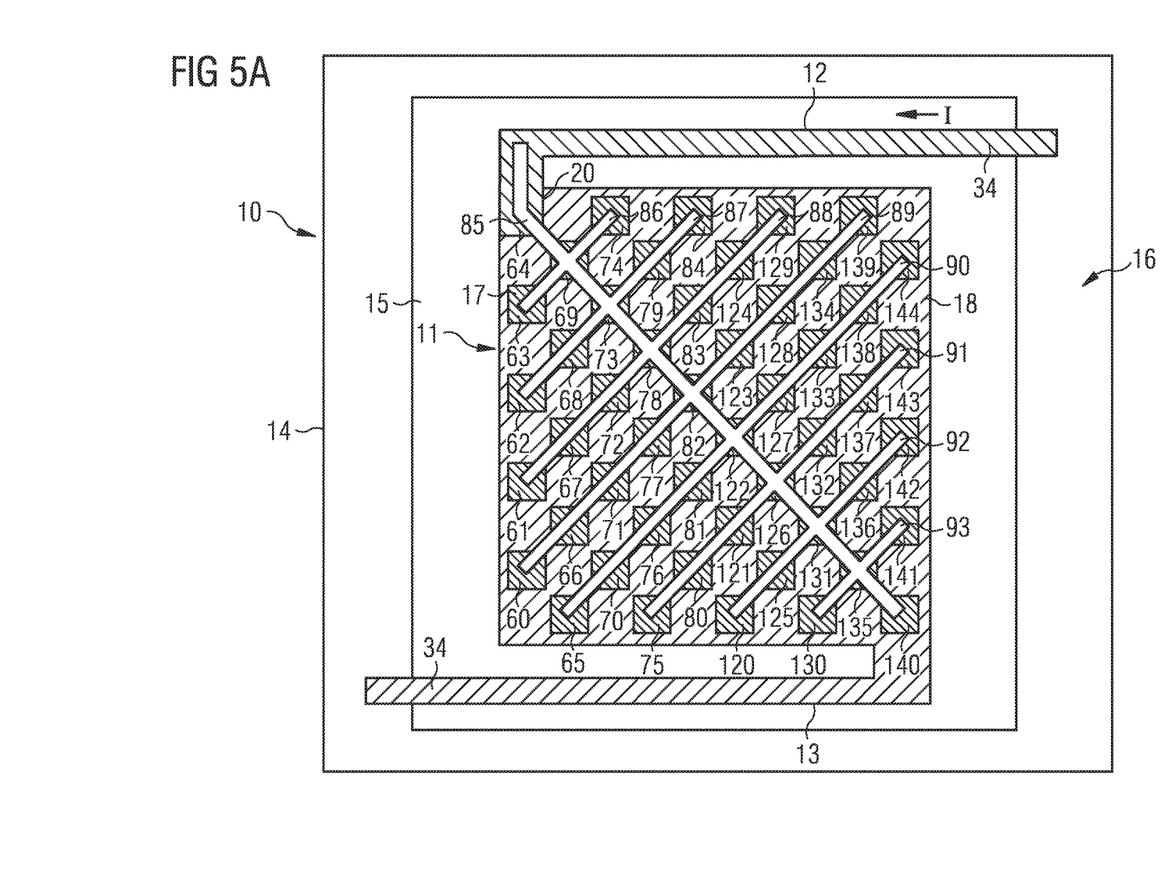
FIGS. 5A and 5B show further exemplary embodiments of the bolometer.

FIG. 5A shows a further exemplary embodiment of the bolometer 10 which is a further development of the above-shown bolometers. The bolometer 10 is similar to the bolometer shown in FIGS. 3A and 3B. Thus, the first region 17 of the semiconductor portion 11 comprises at least two islands 60, 61. The at least two islands 60, 61 are arranged in an array form. The at least two islands 60, 61 are located in a checkered manner on the semiconductor portion 11. The first region 17 comprises a number NI of islands 60 to 84, 120 to 144. The at least two islands 60 to 84, 120 to 144 are connected by the metal connection 85 and the further metal connections 86 to 93 to each other and to the first suspension beam 12. The at least two islands 60 to 84, 120 to 144 are electrically connected to the metal connection 85 and the further metal connections 86 to 93 by vias 101, as illustrated in FIG. 3B. The vias 101 are not shown in FIG. 5A for clarity reasons. The second region 18 surrounds the at least two islands 60, 61 of the first region 17. The at least two islands 60, 61 are rectangular, for example quadratic. The at least two islands 60, 61 are of the same size.

The metal connection 85 and the further metal connections 86 to 93 are arranged in the form of a cross. The metal connection 85 is arranged in a diagonal of the semiconductor portion 11. The further metal connections 86 to 93 are perpendicular to the metal connection 85. Other configurations of metal connections 85 to 93 are possible, such as the comb form of the metal connections 85 to 89 for example, shown in FIG. 3A.

An island 64 of the at least two islands 60 to 84, 120 to 144 is the next island to the first suspension beam 12. Said island 64 may be directly connected to the semiconductor layer 34 of the first suspension beam 12, since the first suspension beam 12 and the at least two islands 60 to 84, 120 to 144 both have the first conductivity type. Said island 64 may have a form that is different from the form of the other islands 60, 61 of the first region 15.

The second region 18 may be connected to the second suspension beam 13 without using metal connections. Thus, the surface of the semiconductor portion 11 that is covered by a metal layer is low, resulting in a low thermal mass and a fast response time of the bolometer 10.

The isolating layer 32 is implemented for absorption of the electromagnetic radiation RA. The isolating layer 32 may consist of silicon dioxide. A thickness of the isolating layer 32 is selected such that the electromagnetic radiation RA is absorbed in the isolating layer 32 even in the case of a reflection of a part of the electromagnetic radiation RA at the metal connections 85 to 93. Advantageously, the isolating layer 32 prevents a possible reflection of electromagnetic radiation RA at the metal connections 85 to 93 from reducing the sensitivity of the bolometer 10.

The first and the second suspension beam 12, 13 are configured to hold the semiconductor portion 11 above the cavity 16. The first and the second suspension beam 12, 13 are designed for thermal isolation of the semiconductor portion 11 to the frame 14. The first and the second suspension beam 12, 13 are realized with a mechanical flexibility and allow a movement of the semiconductor portion 11 with respect to the frame 14. The semiconductor portion 11 is able to move with respect to the frame 14 by a bending of the first and the second suspension beam 12, 13.

The gap 15 is free from any material with the exception of the first and the second suspension beam 12, 13. The cavity 16 is not closed. The bolometer 10 is free from a continuous membrane covering the cavity 16.

The current I flows from the first suspension beam 12 via the metal connection 85 and the further metal connections 86 to 93 to the at least two islands 60, 61 and from the at least two islands 60, 61 via the pn-junction of the diode 20 to the second region 18 and then to the second suspension beam 13.

In an alternative, not shown, embodiment, the at least two islands 60, 61 of the first region 17 have different size.

In an alternative, not shown, embodiment, the at least two islands 60, 61 have another form such as a circle, hexagon, rhombus, triangle, trapezoid or parallelogram.

Figure 5B:
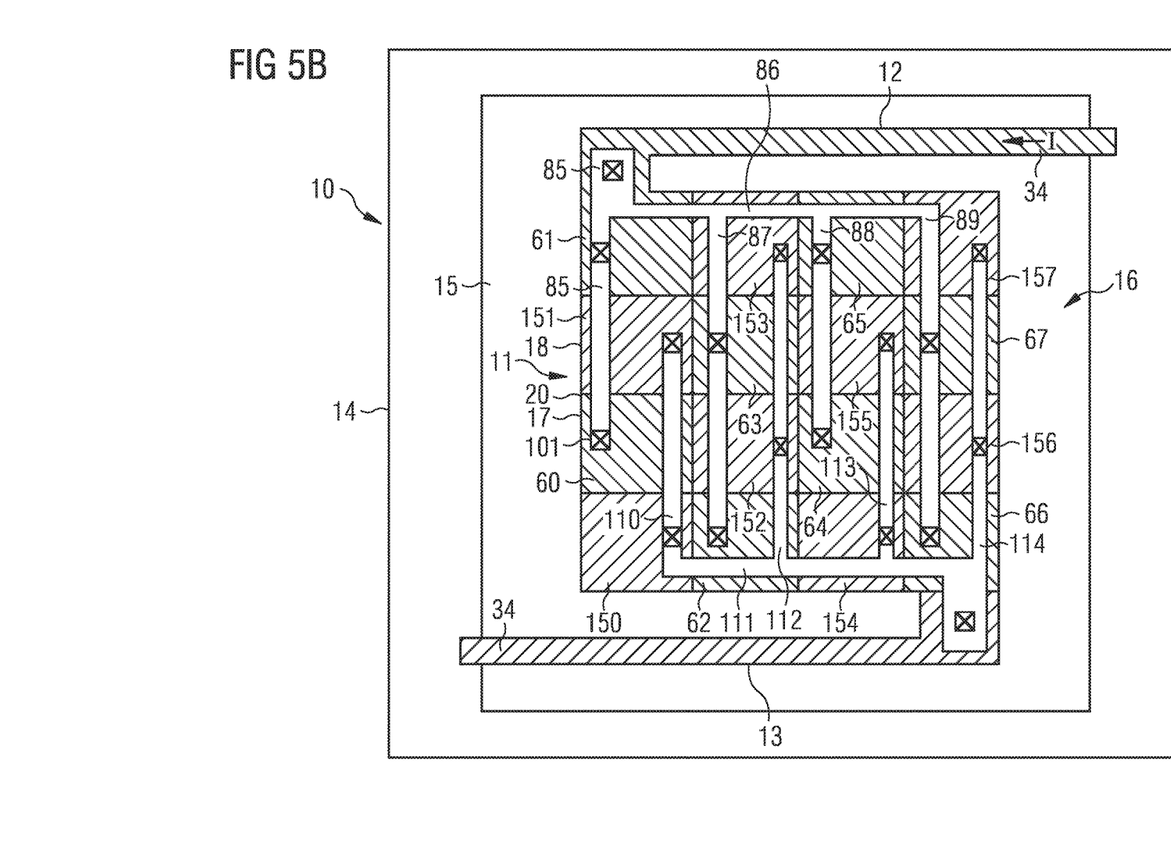

FIG. 5B shows a further exemplary embodiment of the bolometer 10 which is a further development of the above-shown bolometers. The second region 18 comprises at least two additional islands 150 to 157. The at least two additional islands 150 to 157 of the second region 18 obtain the second conductivity type. The at least two islands 60 to 67 of the first region 17 and the at least two additional islands 150 to 157 of the second region 18 are arranged in an array form. The at least two islands 60 to 67 of the first region 17 and the at least two additional islands 150 to 157 of the second region 18 are arranged in a checkered manner. The semiconductor portion 11 is divided in columns and rows. The semiconductor portion 11 comprises at least two columns and at least two rows. In the example shown in FIG. 5B, the semiconductor portion 11 has four columns and four rows. However, the semiconductor portion 11 may contain another number of rows and another number of columns.

The islands 60 to 67 of the first region 17 are separated from the islands 150 to 157 of the second region 18 by space charge regions. Even at the corners of the islands, there is either no electrical connection or only a small electrical connection between islands of the same conductivity type. A small connection may result from an error in the alignment of fabrication masks. The width of the diode 20 is higher in a bolometer 10 shown in FIG. 5B than in the bolometer shown in FIG. 5A.

The at least two islands 60 to 67 of the first region 17 are connected to each other and to the first suspension beam 12 by the metal connection 85 and the further metal connections 86 to 89. Correspondingly, the at least two additional islands 150, 151 of the second region 18 are connected to each other and to the second suspension beam 13 by the additional metal connection 110. The at least two additional islands 150 to 157 may be connected to each other and to the second suspension beam 30 by the additional metal connection 110 and further additional metal connections 111 to 114.

As shown in FIG. 3B, the metal connections 85 to 89, 110 to 114 are separated from the semiconductor portion 11 by the additional isolating layer 100. The island 60 is electrically connected to the metal connection 85 by the via 101. The vias 101 are indicated by crosses in FIG. 5B. The vias 101 electrically connect the islands 60 to 67, 150 to 157 to the metal connections 85 to 89, 110 to 114.

The metal connection 85 and the further metal connections 86 to 89 have a comb shape. Correspondingly, the additional metal connections 110 to 114 also have a comb shape. The metal connections 85 and the further metal connections 86 to 89 on the one hand, and the additional metal connections 110 to 114 on the other hand, form an interdigital structure such as an interdigital transducer. The metal connection 85 and the further metal connections 86 to 89 interlock with the additional metal connections 110 to 114. The metal connections 85 to 89 and the additional metal connections 110 to 114 are fabricated in a first metal layer. Alternatively, the metal connections may have a form different from the form shown in FIG. 5B.

In an alternative embodiment, the bolometer 10 comprises a second metal layer. The metal connections 85 to 89 are realized by the first metal layer. The additional metal connections 110 to 114 are fabricated by the second metal layer. The first metal layer may be above or below the first metal layer.

Figure 6A:
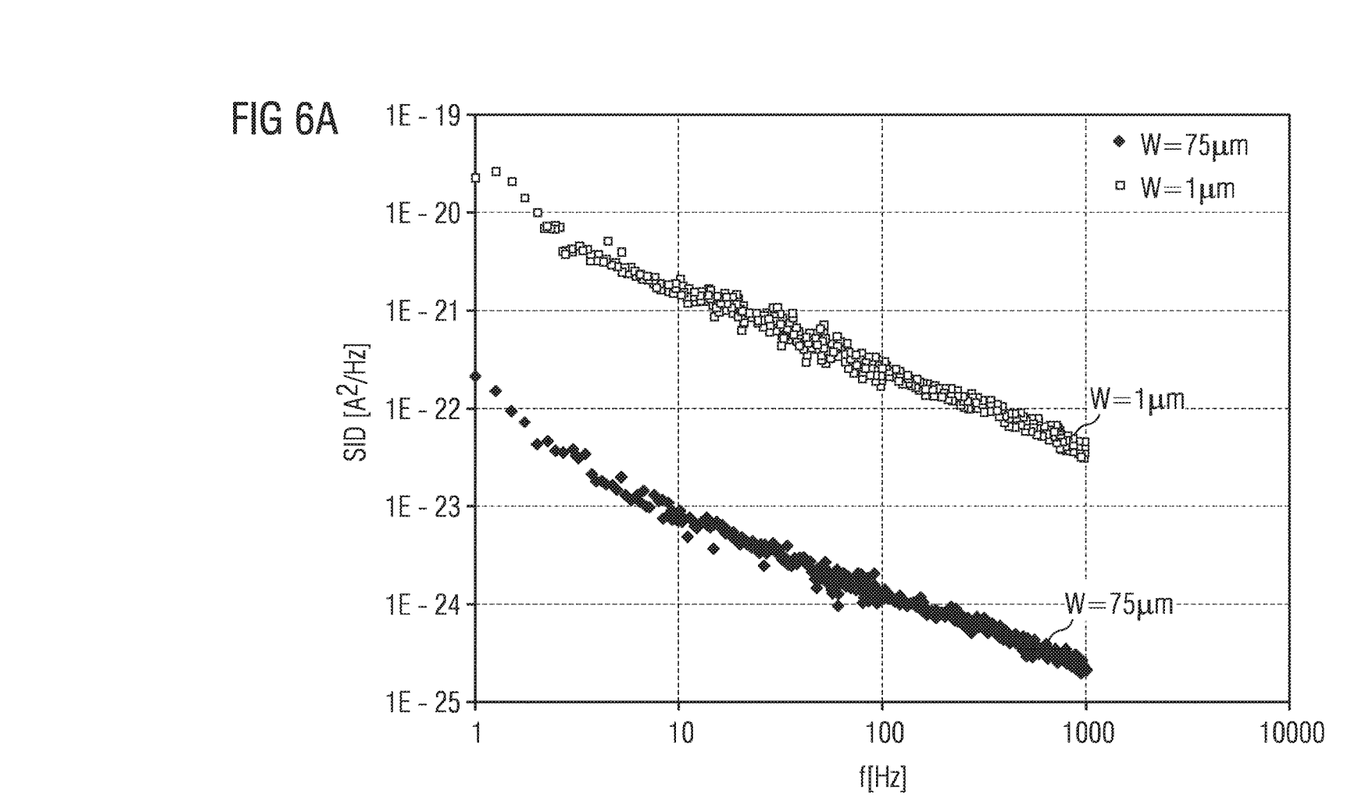
FIGS. 6A and 6B show exemplary embodiments of a characteristic of the bolometer.
Figure 6B:
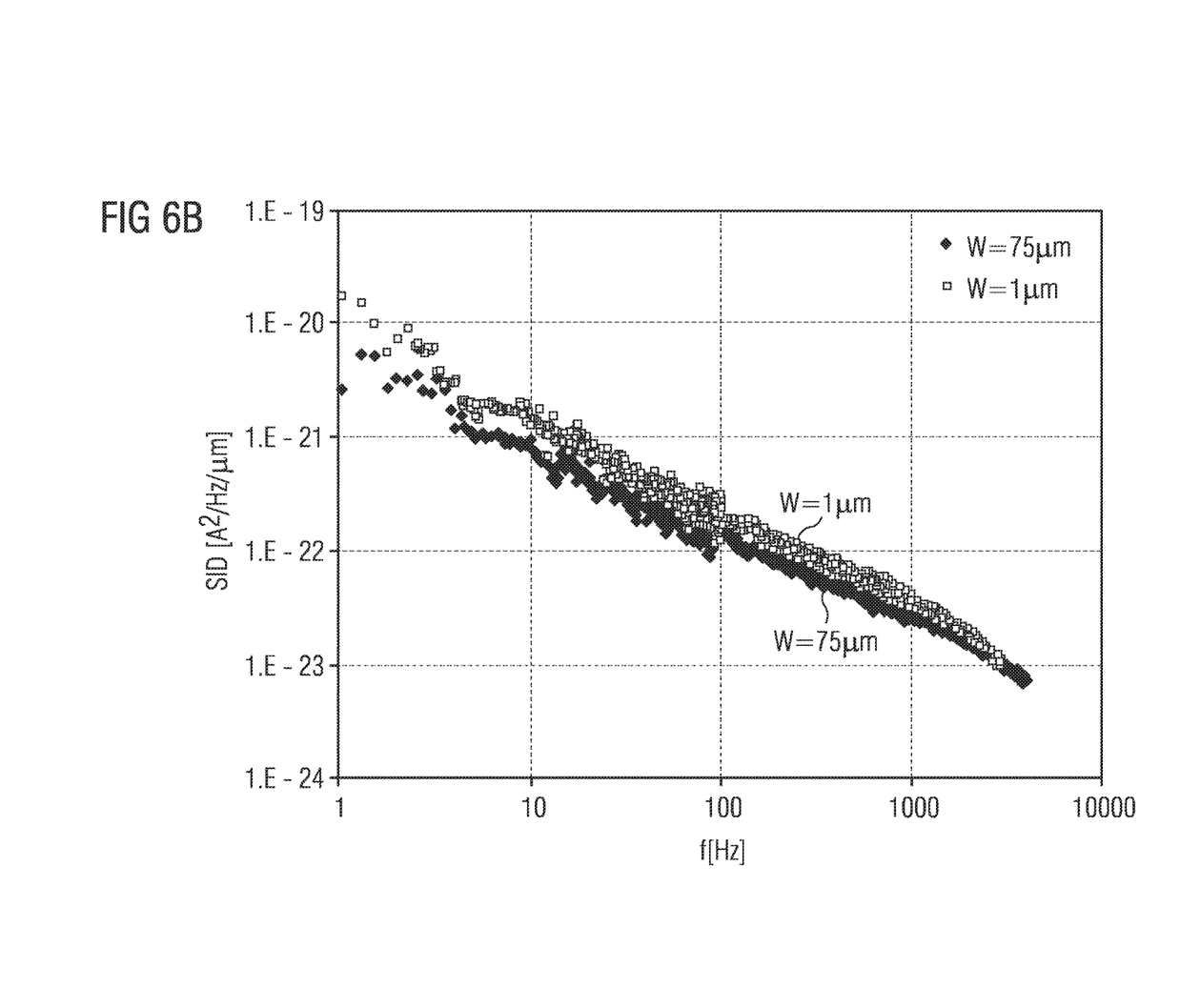

FIGS. 6A and 6B show exemplary characteristics of one of the above shown embodiments of the bolometer 10. In FIG. 6A, the noise current density SID is illustrated over a frequency f for a diode width W of 1 µm and for a diode width W of 75 µm. In FIG. 6B, the noise current density SID scaled with the factor 1/W is shown over the frequency f for the diode width W of 1 µm and 75 µm. The 1/f noise measured in A/sqrt(Hz) scales with the diode width W measured in µm by a factor of 1/sqrt(W) as shown in FIGS. 6A and 6B. The bolometer 10 maximizes the diode width W for a given bolometer area AR and, thus, reduces the 1/f noise component. Subsequently, NETD is advantageously reduced. Thus, the bolometer 10 comprises a low noise diode 20.

We claim:

1. A bolometer, comprising:
a first and a second suspension beam; and
a semiconductor portion that is suspended by the first and the second suspension beam and comprises a first region of a first conductivity type and a second region of a second conductivity type,
wherein the first region comprises at least two stripes or islands which each contribute to a non-short-circuited diode with the second region, and
wherein the at least two stripes of the first region or the at least two islands of the first region are electrically connected to each other and to the first suspension beam by a metal connection.

2. The bolometer according to claim 1, wherein the first region and the second region both reach from a first semiconductor surface of the semiconductor portion to a second semiconductor surface of the semiconductor portion.

3. The bolometer according to claim 1, wherein the diode has a diode width at the first semiconductor surface that is larger than a length of a perimeter of the semiconductor portion.

4. The bolometer according to claim 1, wherein the first region is electrically connected by the first suspension beam and the second region is electrically connected by the second suspension beam.

5. The bolometer according to claim 1, wherein the semiconductor portion is made of poly-silicon.

6. The bolometer according to claim 1, wherein the first semiconductor surface is directed towards an electromagnetic radiation that is to be detected and is covered by an isolating layer.

7. The bolometer according to claim 6, wherein the isolating layer is made of silicon dioxide.

8. The bolometer according to claim 1, wherein the at least two stripes of the first region are rectangular or tapered.

9. The bolometer according to claim 1, wherein the at least two stripes of the first region are electrically connected to each other and to the first suspension beam by a further stripe of the first region.

10. The bolometer according to claim 1, wherein each of the at least two islands of the first region is completely surrounded in the plane of the semiconductor portion by the second region.

11. The bolometer according to claim 1, wherein the at least two islands of the first region are arranged in an array form in a checkered manner.

12. The bolometer according to claim 1, wherein the semiconductor portion is made of poly-silicon or single crystal silicon, and
wherein a perimeter of the semiconductor portion is circular or elliptical or is a hexagon or a rectangle.

13. The bolometer according to claim 1, wherein the diode has a diode width at the first semiconductor surface that is larger than a quarter of a length of the perimeter of the semiconductor portion, and
wherein the diode width is equal to a length of a line or to a sum of the lengths of the lines at which the first region is in contact with the second region at the first semiconductor surface.

14. A method for measurement of electromagnetic radiation, comprising:
setting a diode of a bolometer in an operating point;
absorbing the electromagnetic radiation by the bolometer; and
measuring of an electrical parameter of the diode in the operating point,
wherein the bolometer comprises a first and a second suspension beam and a semiconductor portion which is suspended by the first and the second suspension beam and comprises a first region of a first conductivity type and a second region of a second conductivity type,
wherein the first region comprises at least two stripes or islands which each contribute to the non-short-circuited diode with the second region, and
wherein the at least two stripes of the first region or the at least two islands of the first region are electrically connected to each other and to the first suspension beam by a metal connection.

15. A bolometer, comprising:
a first and a second suspension beam; and
a semiconductor portion which is suspended by the first and the second suspension beam and comprises a first region of a first conductivity type and a second region of a second conductivity type,
wherein the first region comprises at least two stripes which each contribute to a diode with the second region,
wherein the at least two stripes of the first region are electrically connected to the first suspension beam, and
wherein the second region comprises at least one stripe that is electrically connected to the second suspension beam and is arranged between the two stripes of the first region such that the first and the second region form an interdigitated structure.

16. The bolometer according to claim 15, wherein the diode is realized as a non-short-circuited diode.

17. A bolometer, comprising:
a first and a second suspension beam; and
a semiconductor portion that is suspended by the first and the second suspension beam and comprises a first region of a first conductivity type and a second region of a second conductivity type,
wherein the first region comprises at least two stripes or islands which each contribute to a non-short-circuited diode with the second region, wherein the at least two stripes of the first region or the at least two islands of the first region are electrically connected to each other and to the first suspension beam by a metal connection, and wherein the semiconductor portion has a first semiconductor surface that is covered by an isolating layer that is implemented for absorption of the electromagnetic radiation.

\* \* \* \* \*

UNITED STATES PATENT AND TRADEMARK OFFICE
CERTIFICATE OF CORRECTION

| | |
|---|---|
| PATENT NO. | : 10,234,332 B2 |
| APPLICATION NO. | : 15/341963 |
| DATED | : March 19, 2019 |
| INVENTOR(S) | : Georg Roehrer and Sara Carniello |

It is certified that error appears in the above-identified patent and that said Letters Patent is hereby corrected as shown below:

On the Title Page

<u>Column 2, OTHER PUBLICATIONS</u>
Line 1, Delete "Nklaus," and insert -- Niklaus, --.

Signed and Sealed this
Second Day of June, 2020

Andrei Iancu
*Director of the United States Patent and Trademark Office*